United States Patent
Kumagai et al.

(10) Patent No.: US 11,462,776 B2
(45) Date of Patent: Oct. 4, 2022

(54) BATTERY PACK

(71) Applicant: Sony Corporation, Tokyo (JP)

(72) Inventors: Atsuhiro Kumagai, Kanagawa (JP);
Kiyoshi Yonishi, Fukushima (JP);
Shigeji Ikeda, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/937,311

(22) Filed: Jul. 23, 2020

(65) Prior Publication Data

US 2020/0358144 A1    Nov. 12, 2020

Related U.S. Application Data

(63) Continuation of application No. 15/708,939, filed on Sep. 19, 2017, now Pat. No. 10,797,362, which is a
(Continued)

(30) Foreign Application Priority Data

May 15, 2012 (JP) .................................. 2012-111421

(51) Int. Cl.
*H01M 10/48* (2006.01)
*H01M 50/209* (2021.01)
(Continued)

(52) U.S. Cl.
CPC ....... *H01M 10/48* (2013.01); *H01M 10/0525* (2013.01); *H01M 10/486* (2013.01);
(Continued)

(58) Field of Classification Search
CPC ............. H01M 10/48; H01M 10/0525; H01M 2/0215; H01M 2/0404; H01M 2/1061;
(Continued)

(56) References Cited

U.S. PATENT DOCUMENTS

2003/0085686 A1    5/2003   Haga
2003/0180582 A1*   9/2003   Masumoto .......... H01M 50/209
                                                        429/149
(Continued)

FOREIGN PATENT DOCUMENTS

CN    1411093 A    4/2003
CN    1716679 A    1/2006
(Continued)

OTHER PUBLICATIONS

CN 101615700 MT (Year: 2009).*
(Continued)

*Primary Examiner* — Alexander Usyatinsky
(74) *Attorney, Agent, or Firm* — Oblon, McClelland, Maier & Neustadt, L.L.P.

(57) ABSTRACT

Embodiments of the invention provide a battery pack including a pack body and a plurality of terminals. The pack body has first and second main surfaces that are opposed to each other in a first axis direction, first and second end surfaces that are opposed to each other in a second axis direction orthogonal to the first axis direction, and first and second side surfaces that are opposed to each other in a third axis direction orthogonal to the first axis direction and the second axis direction. The plurality of terminals includes a positive terminal, a negative terminal, a temperature detection terminal, and a control terminal that are arranged on the first end surface along the third axis direction. The negative terminal is arranged between the temperature detection terminal and the control terminal and closer to the control terminal than the temperature detection terminal.

17 Claims, 11 Drawing Sheets

Related U.S. Application Data continuation of application No. 13/984,666, filed as application No. PCT/JP2012/005186 on Aug. 17, 2012, now Pat. No. 9,799,930.

(51) Int. Cl.
    *H01M 50/147*     (2021.01)
    *H01M 50/543*     (2021.01)
    *H01M 50/555*     (2021.01)
    *H01M 10/0525*     (2010.01)

(52) U.S. Cl.
CPC ....... *H01M 50/147* (2021.01); *H01M 50/209* (2021.01); *H01M 50/543* (2021.01); *H01M 50/555* (2021.01); *H01M 2220/30* (2013.01)

(58) Field of Classification Search
CPC ... H01M 10/486; H01M 2/30; H01M 2220/30
See application file for complete search history.

(56) References Cited

U.S. PATENT DOCUMENTS

| | | | |
|---|---|---|---|
| 2004/0196599 A1* | 10/2004 | Kim | H01M 50/543 361/18 |
| 2005/0272479 A1 | 12/2005 | Infanti | |
| 2006/0166089 A1* | 7/2006 | Suzuki | H01M 10/4257 429/185 |
| 2006/0279254 A1 | 12/2006 | Infanti | |
| 2007/0037045 A1 | 2/2007 | Takeshita et al. | |
| 2008/0050650 A1* | 2/2008 | Hara | H01M 50/296 429/179 |
| 2008/0176134 A1 | 7/2008 | Kim | |
| 2008/0193836 A1 | 8/2008 | Infanti | |
| 2008/0213656 A1 | 9/2008 | Yamasaki et al. | |
| 2009/0186262 A1* | 7/2009 | Takahashi | H01M 50/528 429/90 |
| 2010/0209743 A1 | 8/2010 | Koh et al. | |
| 2011/0171499 A1 | 7/2011 | Infanti | |
| 2012/0237801 A1* | 9/2012 | Tatehata | H01M 10/0525 429/7 |
| 2012/0244389 A1 | 9/2012 | Infanti | |

FOREIGN PATENT DOCUMENTS

| | | | |
|---|---|---|---|
| CN | 101065863 A | | 10/2007 |
| CN | 101494280 A | | 7/2009 |
| CN | 101615700 | * | 9/2009 |
| CN | 101615700 | | 12/2009 |
| EP | 2 083 462 A2 | | 7/2009 |
| JP | 2001-43841 A | | 2/2001 |
| JP | 2002-151162 A | | 5/2002 |
| JP | 2003-17026 A | | 1/2003 |
| JP | 2003-45386 A | | 2/2003 |
| JP | 2003-45388 A | | 2/2003 |
| JP | 2003-86159 A | | 3/2003 |
| JP | 2008-53155 A | | 3/2003 |
| JP | 2003-234129 A | | 8/2003 |
| JP | 2004-235101 A | | 8/2004 |
| JP | 2005-135770 A | | 5/2005 |
| JP | 2005-190891 A | | 7/2005 |
| JP | 2005-293860 A | | 10/2005 |
| JP | 2006-221989 A | | 8/2006 |
| JP | 2007-48720 A | | 2/2007 |
| JP | 2007-48723 A | | 2/2007 |
| JP | 2008-177156 A | | 7/2008 |
| JP | 2009-176486 A | | 8/2009 |
| JP | 2009-301931 A | | 12/2009 |
| JP | 2010-3691 A | | 1/2010 |
| JP | 2010-97944 A | | 4/2010 |
| JP | 2010-192426 A | | 9/2010 |
| JP | 2011-138717 A | | 7/2011 |
| JP | 3177465 U | | 8/2012 |
| JP | 3177469 U | | 8/2012 |
| JP | 2013-239334 A | | 11/2013 |
| KE | 2008-177156 A | | 7/2008 |
| KR | 10-2007-0019594 A | | 2/2007 |
| KR | 10-2007-0026224 A | | 3/2007 |
| KR | 10-2009-0080877 A | | 7/2009 |
| WO | 03/003485 A1 | | 1/2003 |

OTHER PUBLICATIONS

Extended European Search Report issued in Patent Application No. 19172511.8 dated Jul. 31, 2019.
Japanese Office Action issued in Japanese Patent Application No. 2017-011048 dated Jun. 26, 2018 (w/ English translation).
Extended European Search Report issued in European Patent Application No. 17 20 8378.4 dated Mar. 8, 2018.
Office Action issued in Japanese Patent Application No. 2017-011048 dated Dec. 19, 2017.
Korean Office Action issued in Patent Application No. 10-2014-7030856 dated Oct. 18, 2017 (w/ English Translation).
Office Action issued in Japanese Patent Application No. 2012-111421 dated Jan. 5, 2016.
Office Action issued in Japanese Patent Application No. 2012-118398 dated Jan. 5, 2016.
Combined Office Action and Search Report issued in Chinese Patent Application No. 201210291347.7 dated May 20, 2016 (w/ English translation).
Combined Office Action and Search Report issued in Chinese Patent Application No. 201210291600.9 dated May 30, 2016 (w/ English translation).
Chinese Office Action issued in Chinese Patent Application No. 201210291347.7 dated May 16, 2017 (w/ English translation).
Decision to grant a Patent issued in Japanese Patent Application No. 2012-111421 dated Jun. 7, 2016.
Notification to grant a Patent issued in Japanese Patent Application No. 201210291600.9 dated Mar. 29, 2017.
International Search Report issued in PCT/JP2012/005186 dated Nov. 27, 2012 (w/ English translation).
Extended European Search Report issued in Patent Application No. 12180954.5 dated Aug. 7, 2013.
Extended European Search Report issued in Patent Application No. 15156311.1 dated Jun. 15, 2015.
Extended European Searth Report issued in Patent Application No. 15156317.8 dated Jun. 18, 2015.

* cited by examiner

BATTERY PACK

CROSS-REFERENCE TO RELATED APPLICATIONS

This application is a continuation of U.S. application Ser. No. 15/708,939 filed Sep. 19, 2017, which is a continuation of U.S. application Ser. No. 13/984,666 filed Oct. 30, 2014, now U.S. Pat. No. 9,799,930, the entire contents of each of which is incorporated herein by reference. U.S. application Ser. No. 13/984,666 is a 371 of International Application No. PCT/JP2012/005186 filed Aug. 17, 2012, and claims the benefit of priority from prior Japanese Application No. 2012-111421 filed May 15, 2012.

TECHNICAL FIELD

The present technology relates to a battery pack capable of being mounted to an electronic apparatus.

BACKGROUND ART

In a compact electronic apparatus such as a digital still camera, a digital video camera, or a mobile phone, a battery pack like a lithium-ion secondary battery is mounted in a detachable state. Some battery packs are known to include control terminals for communication and temperature detection terminals for temperature detection, in addition to positive terminals and negative terminals. For example, Patent Document 1 below discloses a battery pack including, on the front thereof, a terminal unit in which a control terminal, a negative terminal, a temperature detection terminal, and a positive terminal are arranged in the stated order in a width direction thereof.

On the other hand, generally, a battery pack is prepared for each model of electronic apparatuses, and the arrangement of contacts connected to the terminals of the battery pack is different among each model of electronic apparatuses. Therefore, in an electronic apparatus to which a battery pack including a temperature detection terminal and a control terminal in addition to a positive terminal and a negative terminal is mounted, the arrangement of contacts to be connected to those terminals is determined so as to correspond to the arrangement of those terminals of the battery pack.

Patent Document 1: Japanese Patent Application Laid-open No. 2009-176486

SUMMARY OF INVENTION

Problem to be Solved by the Invention

However, in the case where a battery pack is not correctly mounted to an electronic apparatus or the shape of a contact of the electronic apparatus is defective, a proper mounting state of the battery pack and the electronic apparatus cannot be ensured, which causes a possibility that the electronic apparatus cannot be correctly operated.

In view of the circumstances as described above, it is an object of the present technology to provide a battery pack capable of ensuring a normal operation of an electronic apparatus.

Means for Solving the Problem

In order to achieve the object descried above, according to an embodiment of the present technology, there is provided a battery pack including a pack body and a plurality of terminals.

The pack body has a first main surface and a second main surface that are opposed to each other in a first axis direction, a first end surface and a second end surface that are opposed to each other in a second axis direction orthogonal to the first axis direction, and a first side surface and a second side surface that are opposed to each other in a third axis direction orthogonal to the first axis direction and the second axis direction.

The plurality of terminals include a positive terminal, a negative terminal, a temperature detection terminal, and a control terminal that are arranged on the first end surface along the third axis direction. The negative terminal is arranged between the temperature detection terminal and the control terminal and closer to the control terminal than the temperature detection terminal.

In the battery pack described above, the negative terminal arranged between the temperature detection terminal and the control terminal is arranged closer to the control terminal than the temperature detection terminal. Accordingly, a contact of an electronic apparatus, which is to be connected to the negative terminal, is prevented from being erroneously connected to the temperature detection terminal, and a state where the contact is properly connected to the negative terminal can be stably maintained. As a result, a normal operation of the electronic apparatus can be ensured.

The first end surface may include a first terminal window, a second terminal window, a third terminal window, and a fourth terminal window.

The first terminal window exposes the control terminal to an outside. The second terminal window is provided apart from the first terminal window by a first gap and exposes the negative terminal to the outside. The third terminal window is provided apart from the second terminal window by a second gap larger than the first gap and exposes the temperature detection terminal to the outside. The fourth terminal window exposes the positive terminal to the outside.

The temperature detection terminal may be arranged between the negative terminal and the positive terminal. Since a distance between the positive terminal and the negative terminal can be increased, electrical insulation between both the terminals can be enhanced.

The positive terminal may have an area larger than that of the negative terminal. Accordingly, a degree of freedom on the arrangement of the contact of the electronic apparatus is enhanced, and a proper mounting state of the battery pack can be ensured.

The first end surface may include a first concave portion provided close to the first side surface and a second concave portion provided close to the second side surface. The first concave portion and the second concave portion are arranged on the first end surface and closer to the second main surface than the first main surface.

Accordingly, a function of preventing the battery pack from being erroneously inserted into the electronic apparatus can be obtained.

In this case, the plurality of terminals may be arranged on the first end surface and closer to the first side surface than the second side surface.

Since the symmetry of the terminals with respect to a center line extending on the first end surface and being parallel to the first axis direction is lost, an electrical connection between the terminals and the electronic apparatus at the time of erroneous insertion can be hindered.

Further, in the above case, the first concave portion may have a width dimension larger than that of the second concave portion in the third axis direction.

Accordingly, the interference between the first concave portion and the electronic apparatus can be prevented at the time of proper insertion, and a stable electrical connection with the electronic apparatus can be ensured.

The plurality of terminals may be arranged on the first end surface and closer to the first main surface than the second main surface.

Since the symmetry of the terminals with respect to a center line extending on the first end surface and being parallel to the third axis direction is lost, an electrical connection between the terminals and the electronic apparatus at the time of erroneous insertion can be hindered.

The second end surface may include a locking portion configured to be locked to an electronic apparatus. In this case, the locking portion is arranged on the second end surface and closer to the second main surface than the first main surface.

Accordingly, for example, in the case where the battery pack is mounted to the electronic apparatus with the first end surface side of the battery pack being brought into contact with the electronic apparatus while the second end surface side of the battery pack is rotatably moved about an axis parallel to the third axis direction, the battery pack can be prevented from being accidentally detached from the electronic apparatus.

Effect of the Invention

As described above, according to the present technology, a normal operation of the electronic apparatus can be ensured.

MODE(S) FOR CARRYING OUT THE INVENTION

Hereinafter, an embodiment of the present technology will be described with reference to the drawings.

Figure 1:
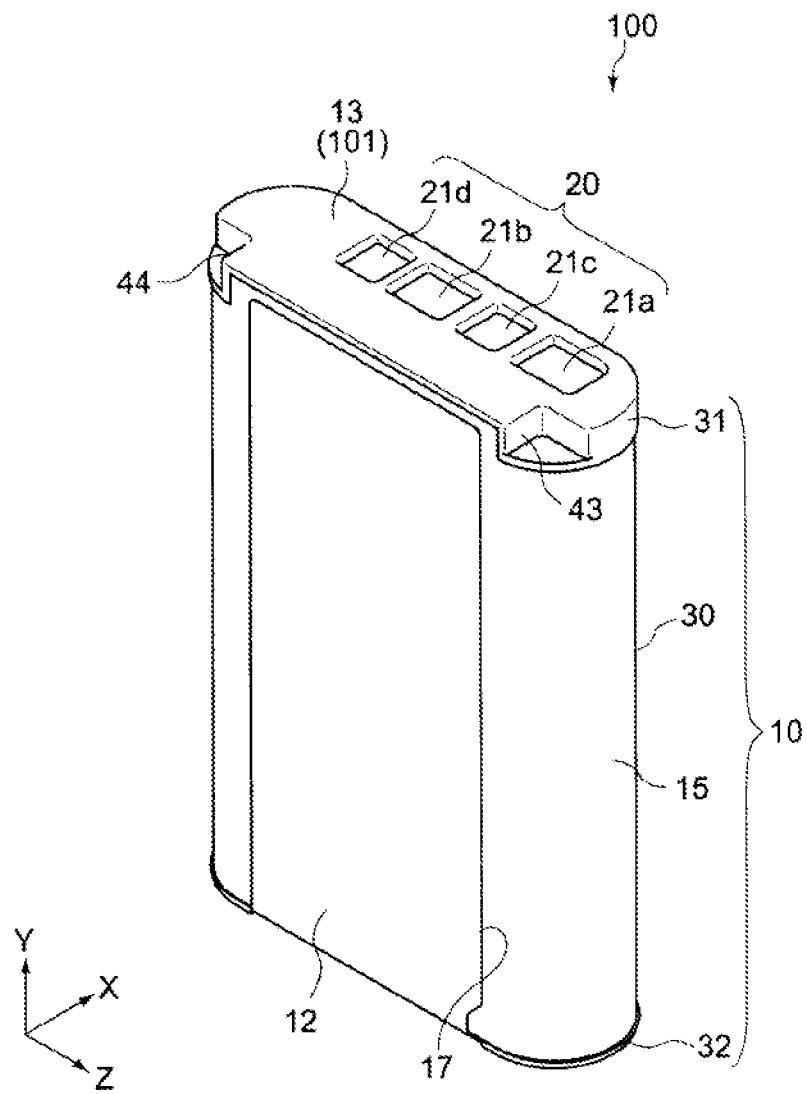
FIG. 1 is a perspective view of a battery pack according to an embodiment of the present technology.
Figure 2:
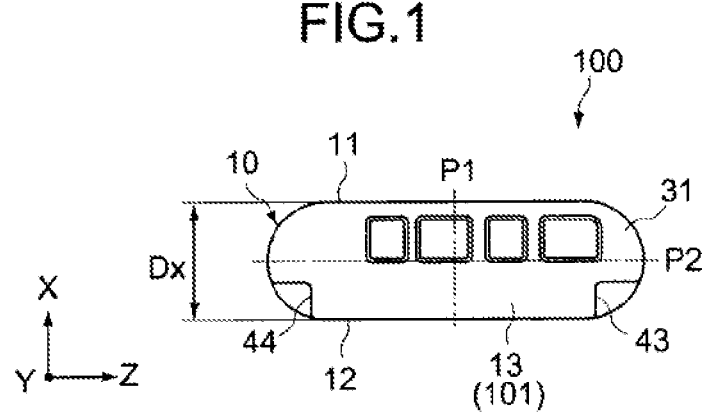
FIG. 2 is a plan view of the battery pack.
Figure 3:
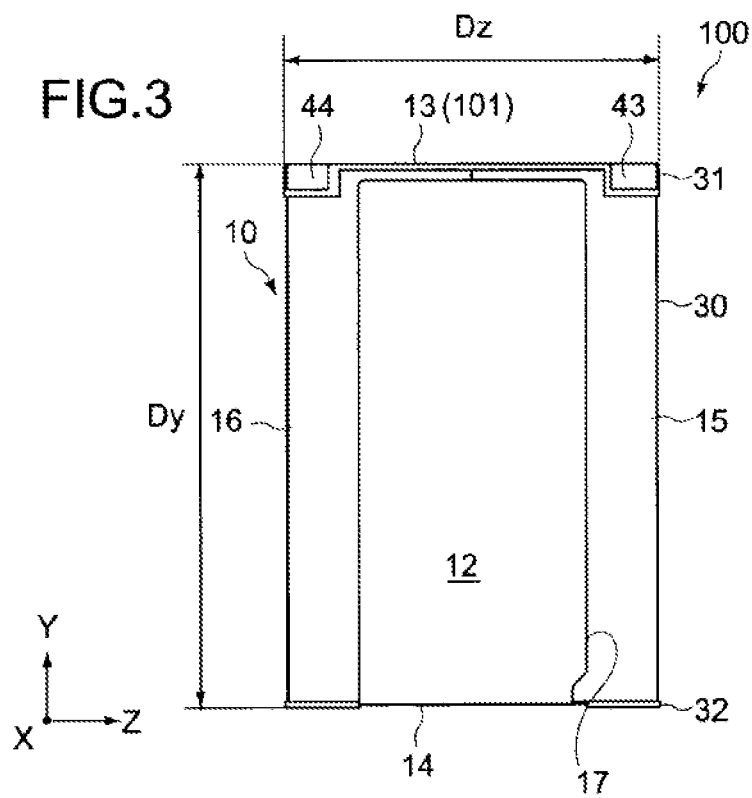
FIG. 3 is a front view of the battery pack.
Figure 4:
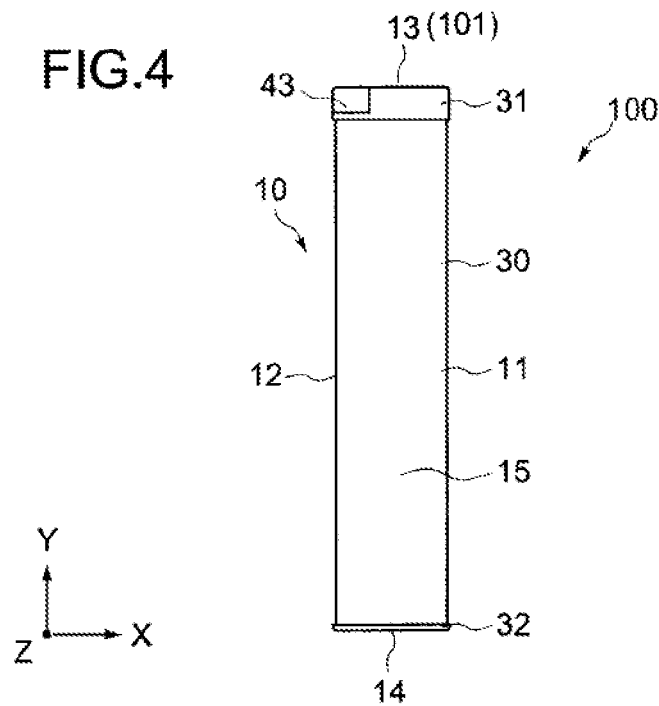
FIG. 4 is a right side view of the battery pack.
Figure 5:
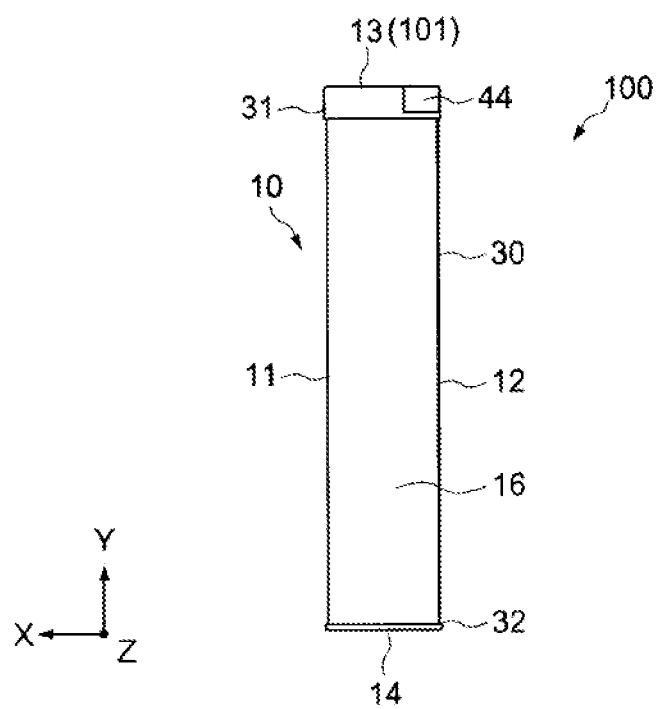
FIG. 5 is a left side view of the battery pack.

FIGS. 1 to 5 each show an outer appearance of a battery pack according to an embodiment of the present technology. FIG. 1 is a perspective view, FIG. 2 is a plan view, FIG. 3 is a front view, FIG. 4 is a right side view, and FIG. 5 is a left side view. In each figure, directions of three axes orthogonal to one another are denoted by X, Y, and Z.

A battery pack 100 of this embodiment includes a pack body 10 and a terminal unit 20.

[Pack Body]

The pack body has an upper surface 11 (first main surface), a lower surface 12 (second main surface), a front surface 13 (first end surface), a rear surface 14 (second end surface), a right side surface 15 (first side surface), and a left side surface 16 (second side surface). The upper surface 11 and the lower surface 12 are opposed to each other in an X-axis direction (first axis direction). The front surface 13 and the rear surface 14 are opposed to each other in a Y-axis direction (second axis direction). The right side surface 15 and the left side surface 16 are opposed to each other in a Z-axis direction (third axis direction). In the figure, the X-axis direction corresponds to a thickness direction of the battery pack, the Y-axis direction corresponds to a length direction thereof, and the Z-axis direction corresponds to a width direction thereof.

The pack body 10 is formed in a substantially rectangular and flat shape as a whole. The upper surface 11 and the lower surface 12 are each formed of a substantially flat surface. The front surface 13 and the rear surface 14 each have a difference in level, and surfaces formed of the differences in level are each formed of a substantially flat surface. The right side surface 15 and the left side surface 16 are each formed of an arc-shaped surface bulging outward. As shown in FIG. 2, the pack body 10 is substantially symmetric with respect to a center line P1 passing the center of the width direction of the front surface 13 and being parallel to the X-axis direction and is also substantially symmetric with respect to a center line P2 passing the center of the thickness direction of the front surface 13 and being parallel to the Z-axis direction, when viewed from the front surface 13 side.

Figure 6:
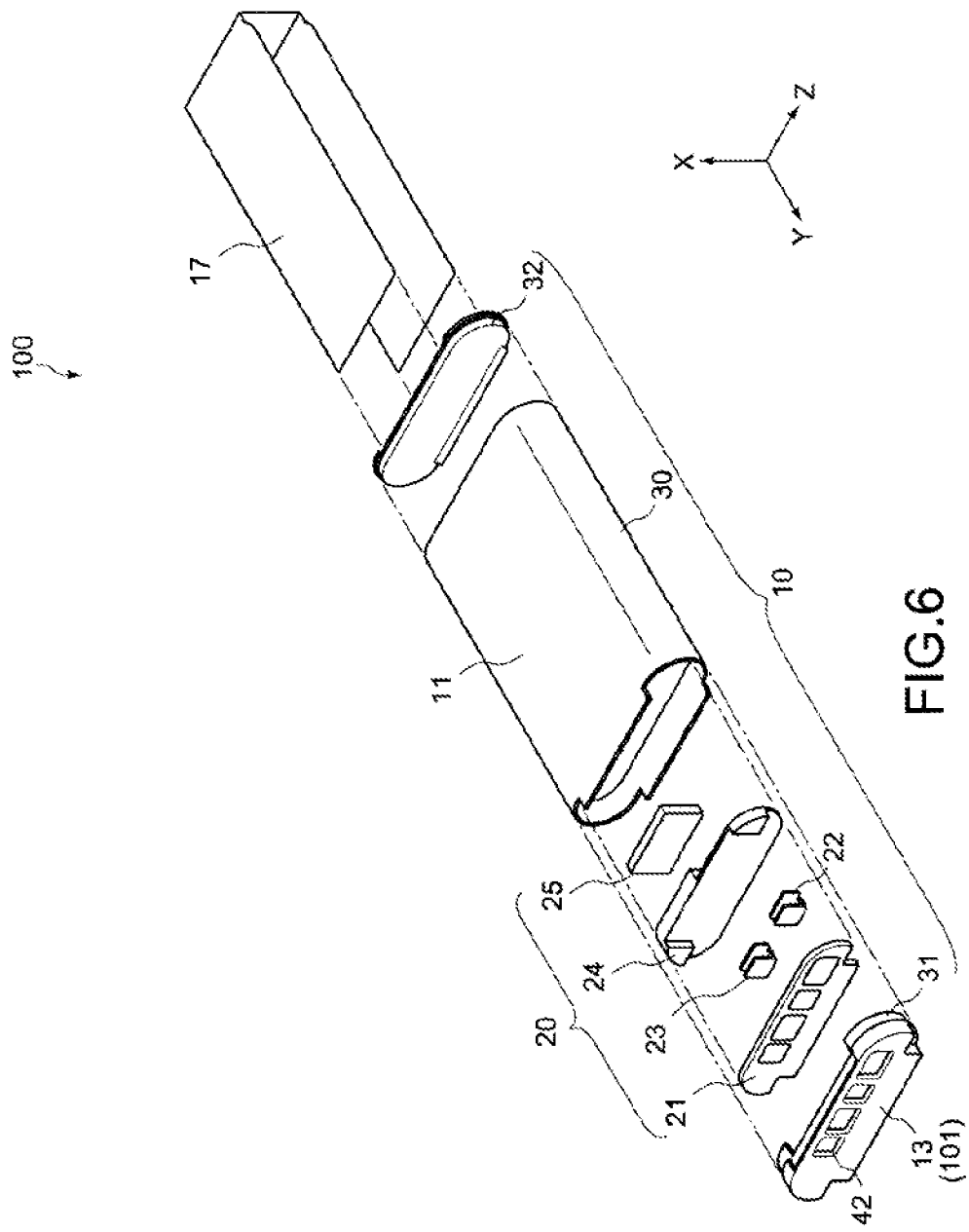
FIG. 6 is an exploded perspective view of the battery pack.

FIG. 6 is an exploded perspective view of a main part of the battery pack 100. The pack body 10 includes a cell unit 30, a top cover 31 fixed to a front end of the cell unit 30, and a bottom cover 32 fixed to a rear end of the cell unit 30. The top cover 31 forms the front surface 13 of the pack body 10, and the bottom cover 32 forms the rear surface 14 of the pack body 10.

The cell unit 30 includes a can body having a substantially rectangular, flat tube shape as a whole, and a battery cell incorporated into the can body. The battery cell is constituted of a non-aqueous electrolyte secondary battery such as a lithium-ion secondary battery. The can body is formed of, for example, a metal material such as aluminum. A resin layer of nylon or the like is provided on a surface of the can body to achieve electrical insulation and protection of the surface of the can body. Further, a resin layer that is made of polypropylene or the like and excellent in insulation property and bending property is provided on an inner surface of the can body, and the can body is capable of being heat-sealed with the top cover 31 and the bottom cover 32 via the resin layer.

The top cover 31 and the bottom cover 32 are each formed of, for example, an injection molded body of a synthetic resin material made of polypropylene or the like. The top cover 31 is attached to the cell unit 30 so as to cover the front end thereof. The bottom cover 32 is attached to the cell unit 30 so as to the rear end thereof. The top cover 31 and the bottom cover 32 have an outer shape corresponding to that of the front end and the rear end of the cell unit 30. Therefore, the top cover 31 and the bottom cover 32 have a substantially oblong shape in plan view.

A label 17 is attached to the pack body 10 over the upper surface 11, the rear surface 14, and the lower surface 12. The label 17 is formed of a resin sheet made of polyethylene terephthalate, for example. A front side of the label 17 is a printed surface on which an insertion direction, a manufacturer name, a model, a mark of terminal, and the like are printed. A rear side of the label 17 is a bonding surface on which a bonding layer is formed.

[Terminal Unit]

The terminal unit 20 is accommodated between the cell unit 30 and the top cover 31. The terminal unit 20 includes a wiring substrate 21, a positive tab 22 and a negative tab 23, a holder 24, and a PTC (Positive Temperature Coefficient) thermistor 25 that are arranged in the stated order from the top cover 31 side.

The holder 24 supports the positive tab 22 and the negative tab 23. The positive tab 22 and the negative tab 23 are connected to a positive lead terminal and a negative lead terminal, respectively, which are drawn from the inside of the cell unit 30. The PTC 25 is arranged between the negative tab 23 and the negative lead terminal. The PTC 25 has a function of substantially blocking a current that flows into the cell unit 30 when the temperature of the cell unit 30 is higher than a set temperature and electrical resistance abruptly increases.

A double-sided substrate is used for the wiring substrate 21. A positive terminal 21*a*, a negative terminal 21*b*, a temperature detection terminal 21*c*, and a control terminal 21*d* are arranged on the surface of the wiring substrate 21 on the top cover 31 side. The positive terminal 21*a* and the negative terminal 21*b* are electrically connected to the positive tab 22 and the negative tab 23, respectively, which are opposed to the rear surface of the wiring substrate 21. The terminals 21*a* to 21*d* are formed to have a conductive pattern obtained by, for example, laminating gold plating layers on a surface of copper foil.

Further, a thermistor as a temperature detection device, a protection circuit that monitors a voltage between terminals, a determination circuit that determines a type of battery and the like, etc. are arranged on the surface of the wiring substrate 21. The thermistor is connected to the temperature detection terminal 21*c*, and the determination circuit is connected to the control terminal 21*d*, for example. It should be noted that the determination circuit may not be mounted depending on the specifications.

The terminals 21*a* to 21*d* of the terminal unit 20 are exposed from the front surface 13 of the pack body 10, that is, from the surface of the top cover 31, to the outside. Therefore, the front surface 13 of the pack body 10 (the surface of the top cover 31) forms the terminal surface 101 of the battery pack 100.

Hereinafter, the battery pack 100 of this embodiment will be described in detail.

(Terminal Arrangement)

In the battery pack 100 of this embodiment, the terminal unit 20 includes the positive terminal 21*a*, the negative terminal 21*b*, the temperature detection terminal 21*c*, and the control terminal 21*d* that are arranged along the Z-axis direction on the terminal surface 101 (the front surface 13 of the pack body 10). The negative terminal 21*b* is arranged between the temperature detection terminal 21*c* and the control terminal 21*d* and closer to the control terminal 21*d* than the temperature detection terminal 21*c*.

Figure 7:
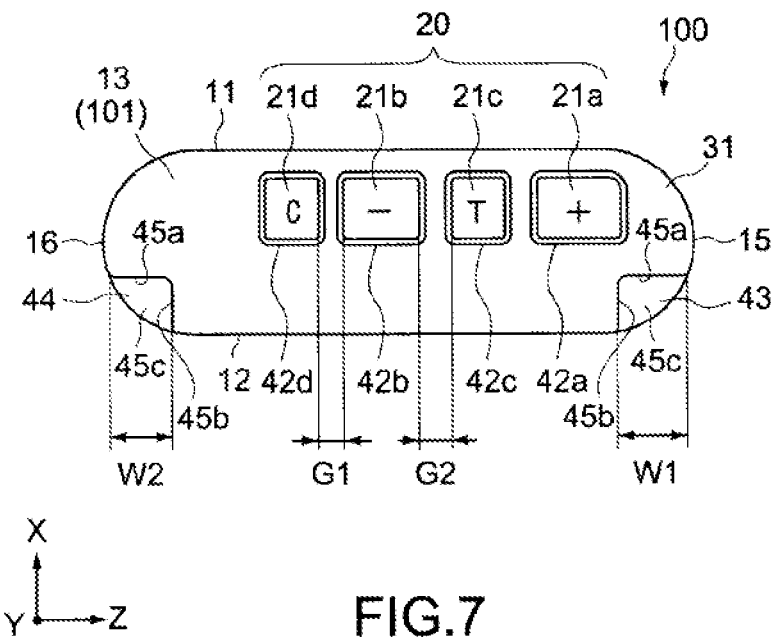
FIG. 7 is a plan view showing a detailed configuration of a terminal surface of the battery pack.

FIG. 7 is an enlarged view of the FIG. 2, showing the terminal surface 101. The terminals of the terminal unit 20 are linearly arranged in the order of the control terminal 21*d*, the negative terminal 21*b*, the temperature detection terminal 21*c*, and the positive terminal 21*a* from the left-hand side of FIG. 7 along the Z-axis direction. The negative terminal 21*b* arranged between the control terminal 21*d* and the temperature detection terminal 21*c* is arranged closer to the control terminal 21*d* than the temperature detection terminal 21*c* as shown in FIG. 7.

It should be noted that in FIG. 7, for the sake of convenience, the control terminal 21*d* is denoted by a symbol "C", the negative terminal 21*b* by a symbol "−", the temperature detection terminal 21*c* by a symbol "T", and the positive terminal 21*a* by a symbol "+", but those symbols may not be imparted to those terminals in reality.

Figure 8:
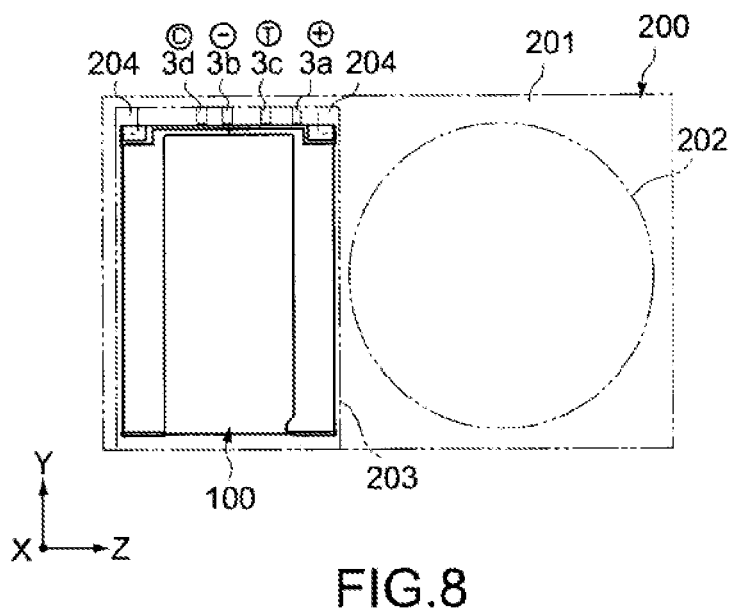
FIG. 8 is a front view schematically showing an electronic apparatus to which the battery pack is mounted.

FIG. 8 is a front view schematically showing an electronic apparatus 200 to which the battery pack 100 is mounted. Although a digital still camera is applied as the electronic apparatus 200, for example, other compact electronic apparatuses such as a digital video camera, a mobile phone, and a portable game device are applicable. Further, examples of the electronic apparatus 200 include a charger for recharging the battery pack 100.

A device body 201 of the electronic apparatus 200 includes a lens barrel unit 202 and a battery mounting unit 203. The battery mounting unit 203 is provided into the device body 201. Though not shown in the figure, the device body 201 has an opening and a lid capable of closing the opening on the bottom surface thereof. The battery pack 100 is inserted into the opening from the terminal surface 101 side to be mounted to the battery mounting unit 203. The battery mounting unit 203 incorporates a positive terminal contact 3*a*, a negative terminal contact 3*b*, a temperature detection terminal contact 3*c*, and a control terminal contact 3*d* that are arranged to be connected to the positive terminal 21*a*, the negative terminal 21*b*, the temperature detection terminal 21*c*, and the control terminal 21*d* of the battery pack 100, respectively. Those contacts 3*a* to 3*d* are arranged so as to correspond to the arrangement order and arrangement intervals of the terminals 21*a* to 21*d* of the battery pack 100. It should be noted that the control terminal contact 3*d* may be omitted depending on the specifications of the electronic apparatus 200.

Along with the downsizing of electronic apparatuses in recent years, battery packs used in those electronic apparatuses are also being downsized. On the other hand, due to the downsizing of electronic apparatuses and battery packs, arrangement intervals between contacts provided to battery mounting units of the electronic apparatuses are also reduced. Therefore, when a battery pack is not correctly inserted into an electronic apparatus or the shape of contacts is defective, a proper mounting state of the battery pack and the electronic apparatus cannot be ensured, which causes a possibility that the electronic apparatus is not allowed to be correctly operated.

For example, in the case where a control terminal, a negative terminal, a temperature detection terminal, and a positive terminal are arranged in the stated order on a terminal surface of a battery pack, when the battery pack is not correctly inserted into an electronic apparatus or the shape of contacts of the electronic apparatus is defective, there is a possibility that a negative terminal contact of the electronic apparatus comes into contact with the temperature detection terminal or the control terminal of the battery pack. Further, when a failure caused when the negative terminal contact comes into contact with the temperature detection terminal is compared with a failure caused when the negative terminal contact comes into contact with the control terminal, the former causes a larger adverse influence from the perspective of ensuring of a normal operation of the electronic apparatus.

In this regard, in the battery pack 100 of this embodiment, the negative terminal 21b arranged between the temperature detection terminal 21c and the control terminal 21d is arranged closer to the control terminal 21d than the temperature detection terminal 21c. Accordingly, the negative terminal contact 3b of the electronic apparatus is prevented from being erroneously connected to the temperature detection terminal 21c, and a state where the negative terminal contact 3b is properly connected to the negative terminal 21b can be stably ensured. As a result, a normal operation of the electronic apparatus 200 can be ensured.

The top cover 31 that forms the terminal surface 101 includes a plurality of terminal windows 42 (42a, 42b, 42c, 42d) (FIGS. 6 and 7). The terminal window 42a exposes the positive terminal 21a to the outside. The terminal window 42d exposes the control terminal 21d to the outside. The terminal window 42b is provided so as to be apart from the terminal window 42d by a first gap (G1), and exposes the negative terminal 21b to the outside. The terminal window 42c is provided so as to be apart from the terminal window 42b by a second gap (G2) larger than the first gap (G1), and exposes the temperature detection terminal 21c to the outside. As a result, predetermined terminal intervals between the terminals 21a to 21d can be ensured, and a proper mounting state of the battery pack 100 with respect to the battery mounting unit 203 can be more stably ensured.

In this embodiment, a longitudinal dimension of the terminals 21a to 21d along the X-axis direction, which are exposed from the terminal surface 101, is 3 mm. A lateral dimension of the positive terminal 21a along the Z-axis direction is 4.25 mm, that of the negative terminal 21b is 3.85 mm, that of the temperature detection terminal 21c and the control terminal 21d is 2.7 n. Further, the gap (G1) between the negative terminal 21b and the control terminal 21d is 1.2 mm, and the gap (G2) between the negative terminal 21b and the temperature detection terminal 21c is 1.65 mm.

In this embodiment, the temperature detection terminal 21c is arranged between the negative terminal 21b and the positive terminal 21a. Since this arrangement increases a distance between the positive terminal 21a and the negative terminal 21b, electrical insulation between those terminals 21a and 21b can be enhanced.

Further, since the above-mentioned arrangement allows the positive terminal 21a to be disposed at the outermost position, a degree of freedom on the shape and size of the positive terminal 21a is enhanced. In this embodiment, the positive terminal 21a is formed to have an area larger than that of the negative terminal 21b. Accordingly, a degree of freedom on the arrangement of the contact 3a of the electronic apparatus is enhanced, and a proper mounting state of the battery pack 100 can be ensured.

(Concave Portion)

The terminal surface 101 of the battery pack 100 includes a first concave portion 43 and a second concave portion 44. The first and second concave portions 43 and 44 are provided at positions substantially symmetric with respect to the center line P1 (FIG. 2) on the terminal surface 101, e.g., at two ends of the terminal surface 101 that are opposed to each other in the Z-axis direction.

In this embodiment, the first concave portion 43 is provided close to the right side surface 15 of the pack body 10, and the second concave portion 44 is provided close to the left side surface 16 of the pack body 10. The first and second concave portions 43 and 44 are arranged on the terminal surface 101 and closer to the lower surface 12 than the upper surface 11 of the pack body 10. In this embodiment, the first and second concave portions 43 and 44 are arranged closer to the lower surface 12 of the pack body 10 than the center line P2 (FIG. 2) on the terminal surface 101.

As shown in FIG. 7, the first and second concave portions 43 and 44 have a width direction in the Z-axis direction, a height direction in the Y-axis direction, and a depth direction in the X-axis direction. The first and second concave portions 43 and 44 each have a planar portion 45a parallel to a YZ plane, a planar portion 45b parallel to an XY plane, and a planar portion 45c parallel to an XZ plane. The first and second concave portions 43 and 44 are each formed to have a cutout whose shape obtained when viewed from the terminal surface 101 side is substantially triangular (also referred to as substantially fan-like) by the planar portion 45a, the planar portion 45b, and the side surface 15 (side surface 16).

Figure 9:
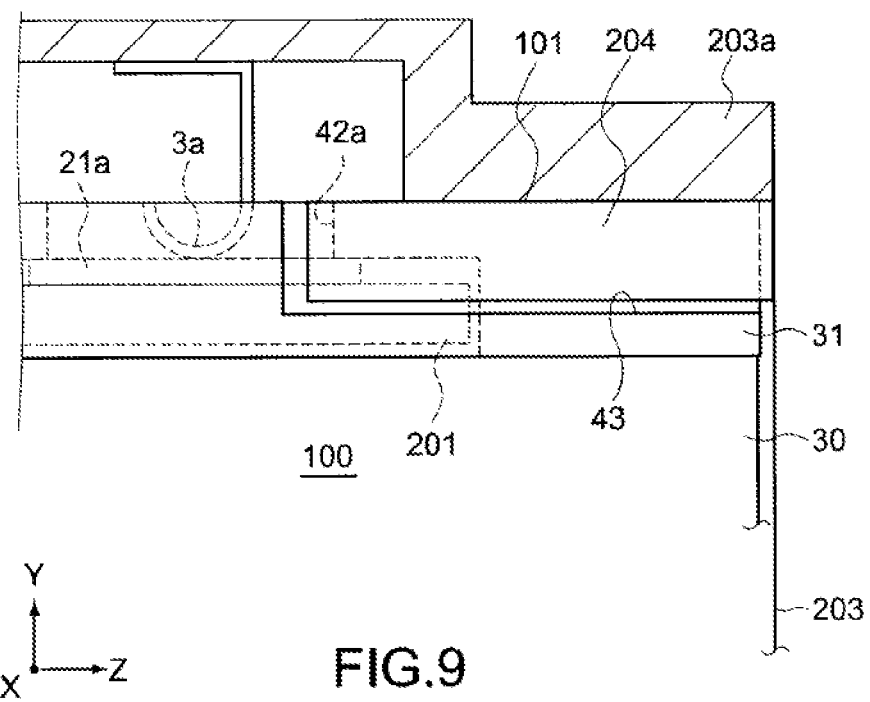
FIG. 9 is a cross-sectional view of a main part of the electronic apparatus to which the battery pack is mounted.

Two protrusions are formed at the bottom portion of the battery mounting unit 203 so as to correspond to the positions at which the first and second concave portions 43 and 44 are formed. FIG. 9 is a cross-sectional view of a main part of the electronic apparatus, showing a relationship between the battery mounting unit 203 and the battery pack 100 that has been properly inserted into the battery mounting unit 203.

The contacts 3a to 3c and two protrusions 204 are provided at a bottom portion 203a of the battery mounting unit 203 that is opposed to the terminal surface 101 of the battery pack 100. The contacts 3a to 3c are arranged so as to be opposed to the terminals 21a to 21d on the terminal surface 101. The two protrusions 204 are arranged so as to correspond to the positions at which the concave portions 43 and 44 are formed. FIG. 9 shows the positive terminal contact 3a connected to the positive terminal 21a of the battery pack 100 and one of the protrusions 204 that is opposed to the first concave portion 43.

When the battery pack 100 is inserted into the electronic apparatus 200 in a proper posture, the protrusions 204 enter regions where the first and second concave portions 43 and 44 are formed, which allows connection between the terminals 21a to 21d of the battery pack 100 and the contacts 3a to 3d of the battery mounting unit 203. In this state, a protruding length, shape, size, and the like of the protrusions 204 may be set such that the protrusions 204 do not come into contact with any surface of the terminal surface 101.

On the other hand, when the battery pack 100 is mounted to the battery mounting unit 203 with the surfaces thereof turned upside down, the protrusions 204 come into contact with regions on the terminal surface 101, in which the first and second concave portions 43 and 44 are not formed, and restrict further insertion of the battery pack 100 from those contacting positions. Accordingly, a function of preventing the battery pack 100 from being erroneously inserted into the electronic apparatus 200 can be obtained, and a user is allowed to recognize that the battery pack 100 is not inserted into the electronic apparatus 200 in a correct posture. Further, when the insertion of the battery pack 100 is restricted due to the protrusions 204 and the terminal surface 101 that are brought into contact with each other, a protruding length of the protrusions 204 or contacts 3a to 3d may be set such that the terminals 21a to 21d do not come into contact with the contacts 3a to 3d.

In this embodiment, as shown in FIG. 7, the terminals 21*a* to 21*d* of the terminal unit 20 are arranged on the terminal surface 101 and closer to the right side surface 15 than the left side surface 16. Accordingly, the symmetry of the terminals 21*a* to 21*d* with respect to the center line P1 parallel to the X-axis direction on the terminal surface 101 is lost, which can hinder an electrical connection between the terminal unit 20 and the electronic apparatus 200 at the time of erroneous insertion.

In this case, the first concave portion 43 has a width dimension larger than that of the second concave portion 44 in the Z-axis direction. Specifically, as shown in FIG. 7, a width dimension W1 of the first concave portion 43 is set to be larger than a width dimension W2 of the second concave portion 44.

Accordingly, at the time of the insertion of the battery pack 100 into the battery mounting unit 203 in a proper posture, the first concave portion 43 on the side on which the terminals 21*a* to 21*d* are arranged can be prevented from interfering with the protrusion 204, and a stable electrical connection between the terminals 21*a* to 21*d* of the terminal unit 20 and the contacts 3*a* to 3*d* of the battery mounting unit 203 can be ensured. Further, the region of the first concave portion 43 is formed to have a relatively large area, and the interference with the protrusion 204 can thus be suppressed, even when dust is accumulated at the corner of the first concave portion 43 and the width of the bottom surface of the cutout region become smaller than the width W1. As a result, a stable electrical connection between the terminal unit 20 and the battery mounting unit 203 is ensured.

The size of the width dimensions W1 and W2 of the first and second concave portions 43 and 44 is not particularly limited. In this embodiment, the width dimension W1 is set to 3.85 mm, and the width dimension W2 is set to 3.5 mm. In addition, a height dimension of the first and second concave portions 43 and 44 along the Y-axis direction is set to, for example, 1.8 mm.

Additionally, the terminals 21*a* to 21*d* of the terminal unit 20 are arranged on the terminal surface 101 and closer to the upper surface 11 than the lower surface 12. In this embodiment, the terminals 21*a* to 21*d* are arranged on the terminal surface 101 and closer to the upper surface 11 of the pack body 10 than the center line P2 (FIG. 2) on the terminal surface 101.

Accordingly, the symmetry of the terminal unit 20 with respect to the center line P2 is lost, which can hinder an electrical connection between the terminals 21*a* to 21*d* and the contacts 3*a* to 3*d* at the time of erroneous insertion of the battery pack 100 into the battery mounting unit 203. Further, regions where the first and second concave portions 43 and 44 are to be formed are easily ensured.

Figure 10:
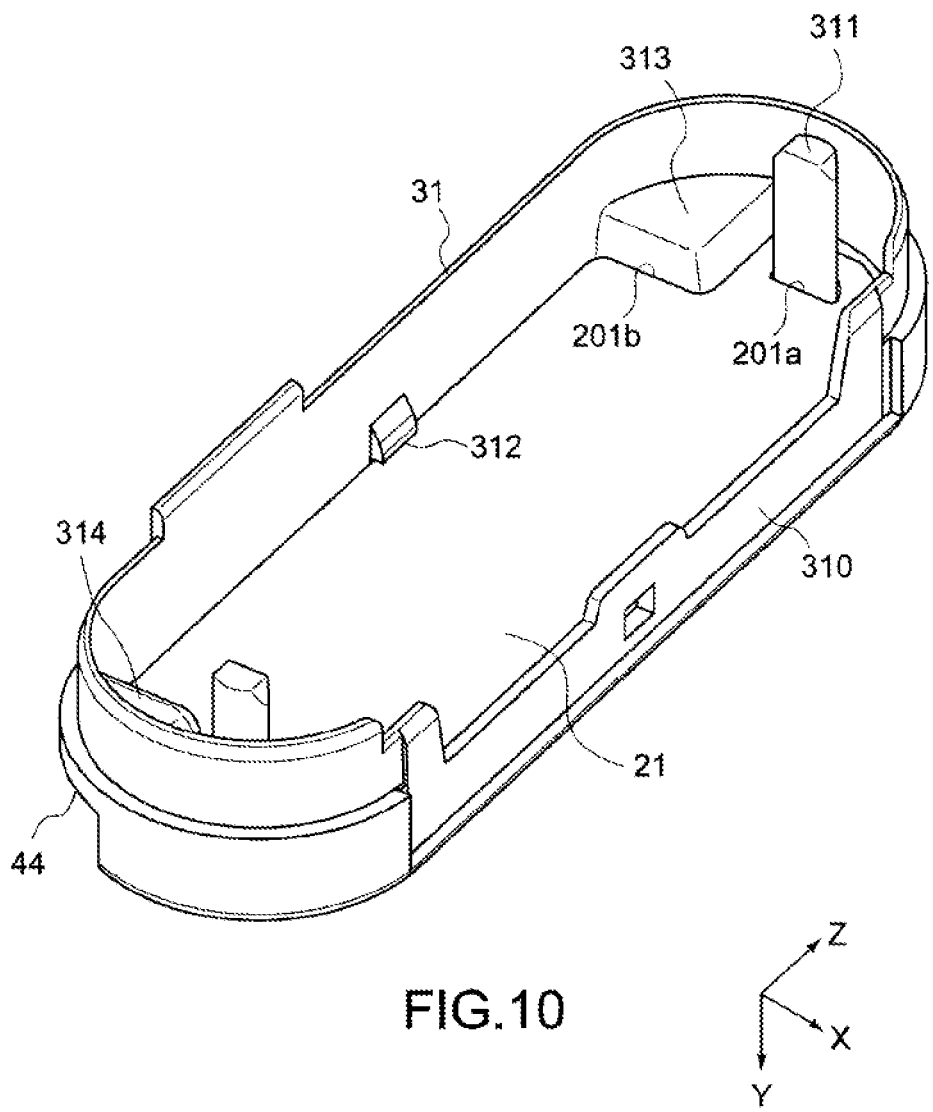
FIG. 10 is a perspective view showing a structure of an inner surface of a top cover that forms the terminal surface of the battery pack.
Figure 11:
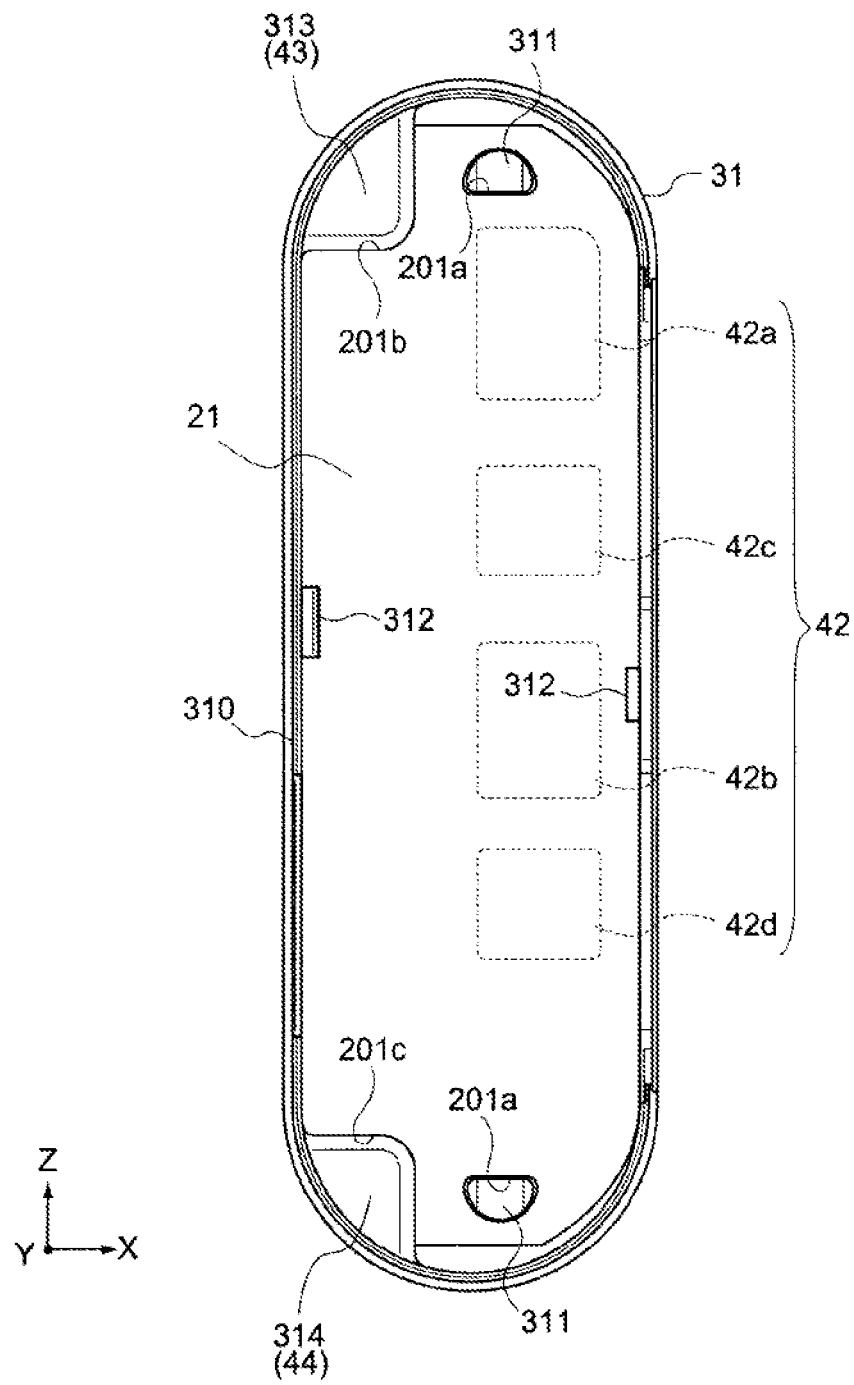
FIG. 11 is a bottom view showing the structure of the inner surface of the top cover.

On the other hand, the formation of the first and second concave portions 43 and 44 allows the strength of the terminal surface 101 to be enhanced. FIGS. 10 and 11 are a perspective view and a plan view showing the structure of the inner surface of the top cover 31. As described above, the top cover 31 is formed of an injection molded body of a synthetic resin material. The top cover 31 includes a peripheral wall portion 310 to be fitted into the front end of the cell unit 30, a pair of reference pins 311 for positioning of the wiring substrate 21, and a pair of fixing claws 312 that fix the wiring substrate 21, in addition to the terminal windows 42*a* to 42*d* and the concave portions 43 and 44.

The first and second concave portions 43 and 44 are formed by depressing predetermined portions of the top cover 31 in the Y-axis direction, and bumps 313 and 314 are formed on the inner surface of the top cover 31 at positions corresponding to the positions where the first and second concave portions 43 and 44 are formed. The pair of reference pins 311 are formed so as to be opposed to each other in the Z-axis direction and determines a position where the wiring substrate 21 is to be attached to the inner surface of the top cover 31. The pair of fixing claws 312 are formed on the inner surface of the peripheral wall portion 310 so as to be opposed to each other in the X-axis direction and engaged with both edges of the wiring substrate 21 positioned by the pair of reference pins 311.

On the other hand, the wiring substrate 21 includes a pair of through-holes 201*a*, through which the pair of reference pins 311 pass, and cutouts 201*b* and 201*c* formed to avoid the interference with the bumps 313 and 314. Various circuit devices such as a thermistor, a determination circuit, and a protection circuit are mounted onto the front side or rear side of the wiring substrate 21.

In the top cover 31 configured as described above, the bumps 313 and 314 each function as a rib for enhancing the rigidity of the entire top cover 31 and improving the strength thereof. With this configuration, the terminal surface 101 is protected against the drop impact of the battery pack 100, and the wiring substrate 21 and various devices mounted thereonto can be prevented from being broken. In addition, the pair of reference pins 311 and the fixing claws 312 allow highly accurate positioning of the wiring substrate 21 with respect to the top cover 31.

Furthermore, since the width dimension W1 of the first concave portion 43 is formed to be larger than the width dimension W2 of the second concave portion 44, the rigidity of the end of the top cover 31 on the right side surface 15 side, on which the terminals 21*a* to 21*d* of the terminal unit 20 are arranged, is enhanced. Accordingly, the terminals 21*a* to 21*d* can be effectively protected against the drop impact.

Figure 12:
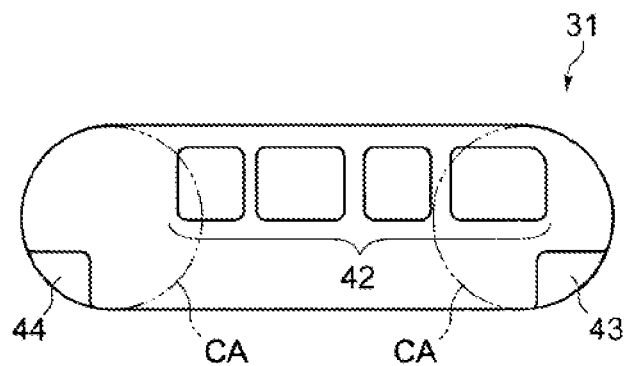
FIG. 12 is a plan view of the top cover.

Moreover, in the top cover 31 of this embodiment, both side surfaces opposed to each other in the width direction (Z-axis direction) are arc-shaped surfaces, and the first and second concave portions 43 and 44 are formed in the arc-shaped regions of the both side surfaces of the top cover 31 (FIG. 12).

FIG. 12 is a plan view showing the front surface of the top cover 31. The both side surfaces of the top cover 31, which are opposed to each other in the width direction, are each formed by a part of a peripheral surface of a cylinder with a predetermined radius, and when viewed from the front surface of the top cover 31, the first and second concave portions 43 and 44 are each provided within a region of a circumference of a circle CA to which each of the both side surfaces belongs. In this way, by the definition of the regions where the first and second concave portions 43 and 44 are to be formed, a substrate area of the wiring substrate 21 arranged on the inner surface of the top cover 31 can be ensured. Further, since the two corners of the pack body (top cover 31) are cut due to the formation of the concave portions 43 and 44, even when the battery pack 100 is dropped erroneously, the drop impact is mitigated compared with the case where the corners are present. As a result, the breakage of the battery pack 100 can be eliminated or minimized.

(Locking Portion)

A battery pack is typically configured to be rechargeable with an electronic apparatus such as a charger. In this case, to maintain a proper connection state between the terminals of the battery pack and the contacts of the charger, the battery pack is required to be stably held by the charger. Typically, in the battery pack, a terminal surface on which the terminals are arranged and an end surface opposite to the terminal surface are locked to a battery mounting unit of the charger.

However, there is a possibility that the battery pack is accidentally detached from the charger by external forces such as a vibration and an impact that act on the charger.

In this regard, in this embodiment, in order to prevent the battery pack from being accidentally detached from the electronic apparatus, the rear surface 14 of the pack body 10 is provided with a locking portion capable of being locked to the electronic apparatus.

Figure 13:
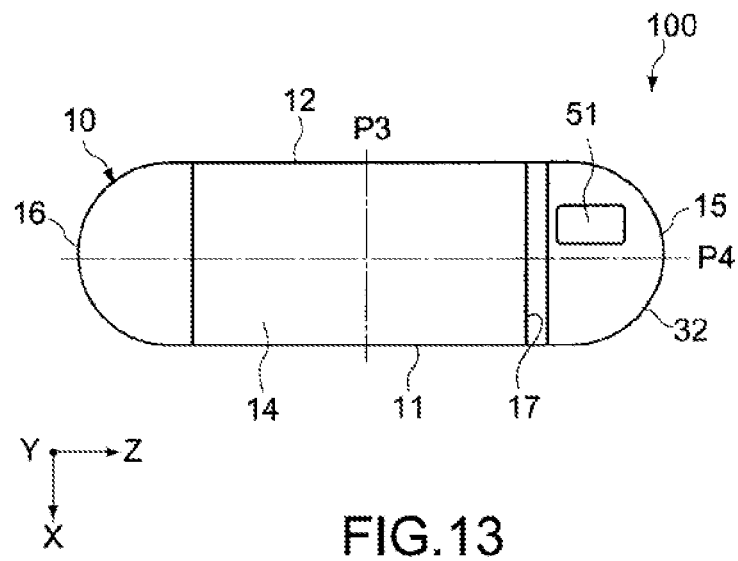
FIG. 13 is a plan view of a bottom cover that forms a rear surface of the battery pack.

FIG. 13 is a bottom view of the battery pack 100 (pack body 10). The rear surface 14 of the pack body 10, which is formed by a surface of the bottom cover 32, is provided with a locking portion 51. The locking portion 51 is typically formed by a substantially rectangular concave portion, but it may be formed by a convex portion or a flat surface. The locking portion 51 is arranged closer to one side surface than a center line P3 passing the center of the width direction (Z-axis direction) of the rear surface 14 and being parallel to the X-axis direction. In this embodiment, the locking portion 51 is provided close to the right side surface 15 of the pack body 10.

Figure 14:
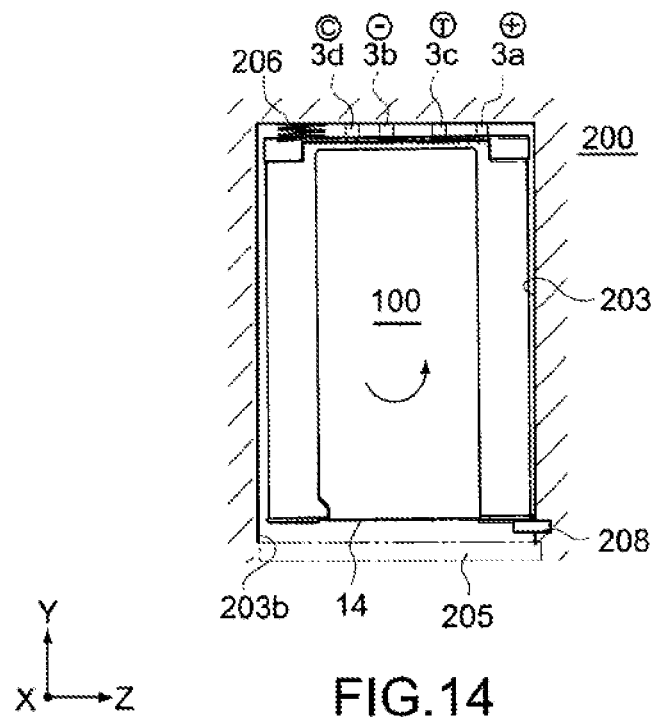
FIG. 14 is a cross-sectional view of a main part of the electronic apparatus to which the battery pack is mounted.

FIG. 14 is a cross-sectional view of a main part of the electronic apparatus 200, showing a state when the battery pack 100 is mounted to the battery mounting unit 203. The battery mounting unit 203 includes an opening 203b, in which a locking claw 208 and a lid 205 are provided. The locking portion 51 is locked to the locking claw 208 when the battery pack 100 is inserted into the battery mounting unit 203 in a proper posture. Accordingly, the battery pack 100 is fixed to the battery mounting unit 203.

Further, an elastic member (coil spring) 206 for ejecting the battery pack 100 is arranged at the bottom portion 203a of the battery mounting unit 203. The elastic member 206 biases the terminal surface 101 of the battery pack 100 inserted into the battery mounting unit 203 so as to eject the battery pack 100 to the opening 203b side. Since the elastic member 206 and the locking claw 208 are arranged at positions of the battery pack 100 on a substantially diagonal line, an elastic force of the elastic member 206 generates a moment to turn the battery pack 100 about an axis parallel to the X axis within the battery mounting unit 203, as shown in FIG. 14. Accordingly, since the moment acts to enhance the connection between the terminals 21a to 21d of the terminal surface 101 and the contacts 3a to 3d of the battery mounting unit 203, a stable electrical connection between the battery pack 100 and the electronic apparatus 200 is achieved.

It should be noted that depending on the type of electronic apparatus, the locking claw 208 may be provided to the opening 203b in such a positional relationship that the locking claw 208 is opposed to the elastic member 206. In this case, the locking portion 51 may be provided close to the left side surface 16 of the pack body 10 or may be provided close to the both side surfaces.

Further, the locking portion 51 is arranged on the rear surface 14 of the pack body 10 and closer to the lower surface 12 than the upper surface 11. In this embodiment, as shown in FIG. 13, the locking portion 51 is arranged closer to the lower surface 12 of the pack body 10 than a center line P4 extending on the rear surface 14 and parallel to the Z axis. Accordingly, the battery pack 100 can be prevented from being accidentally detached from an electronic apparatus including a battery mounting unit as shown in FIG. 15, for example.

Figure 15:
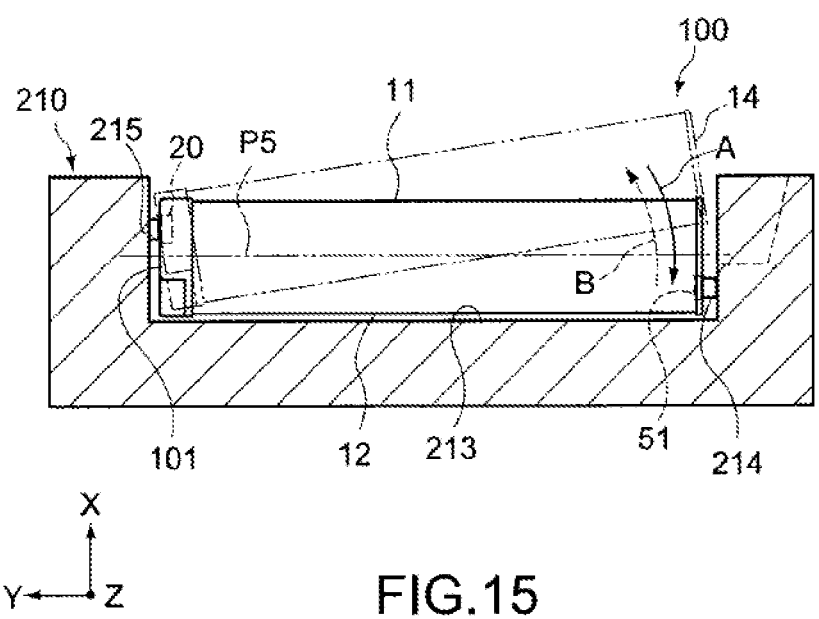
FIG. 15 is a cross-sectional view of a main part of another electronic apparatus to which the battery pack is mounted.

An electronic apparatus 210 shown in FIG. 15 includes a battery mounting unit 213 in which the battery pack 100 can be accommodated on an upper surface thereof. The battery mounting unit 213 has a pair of inner wall surfaces opposed to each other in the Y-axis direction. A contact portion 215 to be connected to the terminal surface 101 (terminal unit 20) of the battery pack 100 is arranged on one of the inner wall surfaces, and a locking claw 214 to be locked to the rear surface 14 (locking portion 51) of the battery pack 100 is arranged on the other inner wall surface. The battery pack 100 is mounted to the battery mounting unit 213 with the terminal surface 101 being brought into contact with the contact portion 215, while the rear surface 14 side of the battery pack 100 is rotatably moved in a direction indicated by the arrow A about an axis parallel to the Z axis. Examples of the electronic apparatus 210 adopting the battery mounting unit 213 having such a structure includes a charger.

Here, the terminals 21a to 21d of the terminal unit 20 are arranged close to the upper surface 11, and the locking portion 51 is arranged close to the lower surface 12, with a center line P5 interposed between the upper surface 11 and the lower surface 12, the center line P5 passing the center of the thickness direction of the pack body 10 and being parallel to the Y-axis direction (FIG. 15). Further, in many cases, the battery mounting unit 213 has a structure in which one of the contact portion 215 and the locking claw 214 presses the terminal unit 20 or the locking portion 51 by an elastic force. Therefore, in the state where the battery pack 100 is mounted to the battery mounting unit 213, the battery pack 100 is held with the moment imparted in the direction indicated by the arrow A. Therefore, even in the case where an external force such as a vibration acts on the electronic apparatus 210 in a direction in which the battery pack 100 is detached from the battery mounting unit 213 (direction indicated by the arrow B opposite to the arrow A), the battery pack 100 can be stably held.

(Size of Battery Pack)

As shown in FIGS. 2 and 3, the battery pack 100 of this embodiment has the thickness direction in the X-axis direction, the length direction in the Y-axis direction, and the width direction in the 2-axis direction. In one embodiment, a dimension in the thickness direction (Dx) is 9 mm±2 mm, a dimension in the length direction (Dy) is 43 mm±2 mm, and a dimension in the width direction (Dz) is 30 mm±2 mm. For example, Dx is 9.13 mm (+0.37 mm, −0.10 mm), Dy is 42.64 mm (±0.16 mm), and Dz is 29.85 mm±0.15 mm.

In recent years, the battery pack has been demanded for thinning and downsizing while maintaining a necessary battery capacity. However, it is difficult for a thin battery pack to have a large battery capacity. When the length dimension and width dimension of a thin battery pack are increased, the interference with a structural portion of a lens barrel or the like is caused, which makes it difficult to downsize a camera body. On the other hand, when the thickness dimension of the battery pack is increased, the recent demand for the thinning of the electronic apparatus is not met.

In this regard, in the battery pack 100 of this embodiment, the dimensions of the respective portions of the battery pack 100 are set to the above-mentioned dimensions in order to ensure the thinning and a necessary battery capacity. The battery pack 100 with such a size is suitable for, for example, a battery pack of an imaging apparatus for capturing still images or moving images.

(Shape of Terminal Window)

In the battery pack 100 of this embodiment, the top cover 31 includes a plurality of rectangular terminal windows 42, from which the terminals 21a to 21d of the terminal unit 20 are exposed to the outside.

If a cover attached to an end surface of a battery pack is provided with an opening like a terminal window, the rigidity of the cover is generally reduced, and the cover is easily broken when an external force such as a drop impact is received, for example.

In this regard, to enhance the durability of the top cover 31 against the drop impact and the like, in this embodiment, one terminal window of the plurality of the terminal windows 42 that is located at the outermost position in the Z-axis direction has one corner portion formed in a curvature radius larger than that of the other corner portions of the terminal window.

Figure 16:
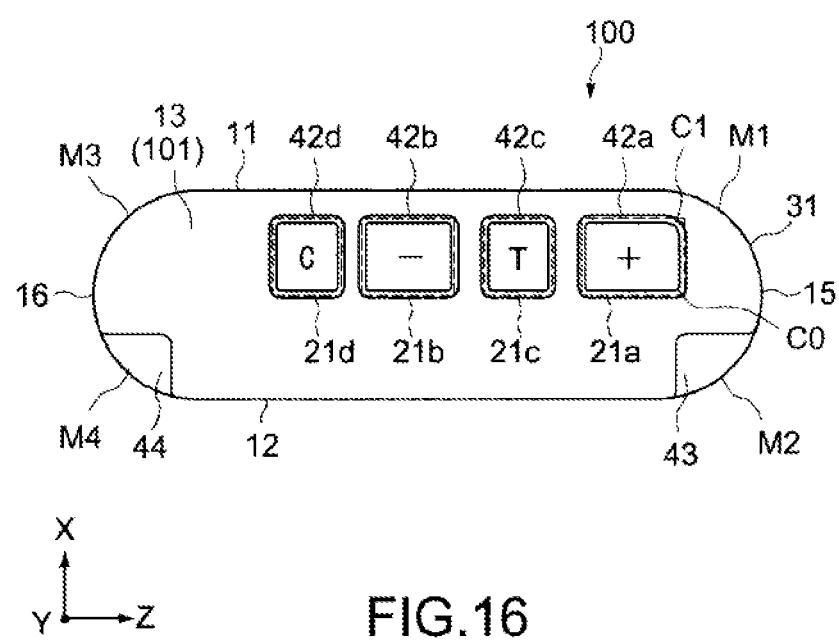
FIG. 16 is a plan view for describing details of terminal windows formed on the top cover.

FIG. 16 is a plan view showing the shape of the terminal windows 42 (42a to 42d) of the top cover 31. In this embodiment, the terminal window 42a for the positive terminal 21a, which is located at the outermost position in the Z-axis direction among the plurality of terminal windows 42a to 42d, has a corner portion C1 formed in a curvature radius larger than that of the other corner portions C0. The other corner portions other than the corner portion C1 of the terminal window 42a, and corner portions of the other terminal windows 42b to 42d other than the terminal window 42a are formed in a curvature radius equal to that of the corner portions C0.

The terminal window 42a located at the outermost position of the top cover 31 in the width direction is most susceptible to an external force such as a drop impact applied to the battery pack 100, and the top cover 31 is easily broken. In this embodiment, since the corner portion C1 having a curvature radius larger than that of the other corner portions C0 is provided at one portion of the terminal window 42a, the rigidity at the part of the corner portion C1 can be enhanced and the top cover 31 can be protected against the breakage. Further, the positive terminal 21a exposed from the terminal window 42a is also protected.

The corner portion C1 is a corner portion provided at the position closest to any one of the upper surface 11, the lower surface 12, the front surface 13, the rear surface 14, the right side surface 15, and the left side surface 16 of the pack body 10. Accordingly, the breakage of the top cover 31 due to an external force applied to any one of the surfaces can be suppressed. In this embodiment, the corner portion C1 is provided at the position closest to the upper surface 11 or the right side surface 15 of the pack body 10.

The corner portion C1 is a corner portion provided at the position closest to any one of the right side surface 15 and the left side surface 16 of the pack body 10. Accordingly, the breakage of the top cover 31 due to an external force applied to any one of the surfaces can be suppressed. In this embodiment, the corner portion C1 is provided at the position closest to the right side surface 15 of the pack body 10.

The top cover 31 includes four corner portions M1, M2, M3, and M4. In this embodiment, the corner portion C1 is provided at the position closest to the corner portion M1 of the four corner portions M1 to M4. Accordingly, the terminal window 42a can be effectively protected against an external force applied to the corner portion M1. The corner portion C1 is not limited to the example in which it is provided at the above-mentioned position. For example, the corner portion C1 may be provided at a corner portion of the terminal window 42a close to the corner portion M2 or a corner portion of the terminal window 42d for the control terminal 21d, close to the corner portion M3 or M4.

Further, in this embodiment, the plurality of terminal windows 42a to 42d are arranged close to the upper surface 11 of the battery pack 100. In this embodiment, since the corner portion C1 of the terminal window 42a close to the corner portion M1 is formed in a curvature radius larger than that of the other corner portions C0, even if the corner portion M1 and the terminal window 42a become close to each other, the concentration of a stress generated therebetween can be reduced, and the top cover 31 can be protected against a breakage.

In addition, in this embodiment, the plurality of terminal windows 42a to 42d are arranged close to the right side surface 15 of the battery pack 100. Also in such a case, the concentration of a stress generated between the corner portion M1 and the terminal window 42a can be reduced, and the breakage of the top cover 31, such as a crack of the terminal surface 101, can be hindered.

Modified Example

Hereinafter, the embodiment of the present technology has been described, but the present technology is not limited to the embodiment described above. As a matter of course, the present technology may be variously modified without departing from the gist of the present technology.

For example, in the embodiment described above, the pack body 10 is constituted of a combination of the cell unit 30, the top cover 31, and the bottom cover 32. Though not limited thereto, the pack body may be constituted of a single component.

The right side surface 15 and the left side surface 16 are each formed by an arc-shaped surface bulging outward. Though not limited thereto, the right side surface 15 and the left side surface 16 may be formed in a substantially planar shape partially including an arc-shaped surface or only a substantially planar shape.

Further, in the embodiment described above, the structural example has been described, in which the terminal unit 20 is arranged between the cell unit 30 and the top cover 31, and the terminals 21a to 21d of the terminal unit 20 are exposed to the outside via the terminal windows 42 of the top cover 31. However, the terminals of the terminal unit may be directly provided to the front surface of the pack body.

The terminal unit 20 has the configuration in which the control terminal, the negative terminal, the temperature detection terminal, and the positive terminal are arranged in the stated order along the Z axis, but it is not limited thereto. The terminal unit 20 may have a configuration in which the control terminal, the positive terminal, the temperature detection terminal, and the negative terminal are arranged in the stated order along the Z axis.

The terminals 20a to 20d of the terminal unit 20 are arranged close to the upper surface 11 of the battery pack 100. However, the terminals 20a to 20d may be arrange at substantially the center of the terminal surface 101 or arranged close to the lower surface 12. In this case, the first and second concave portions 43 and 44 may be arranged close to upper surface 11 of the battery pack 100.

Further, the terminals 20a to 20d of the terminal unit 20 are arranged close to the right side surface 15 of the battery pack 100, but it may be arranged close to the left side surface 16. In this case, out of the first and second concave portions 43 and 44, the second concave portion 44 provided close to the left side surface 16 may be formed in a width dimension larger than that of the first concave portion 43.

It should be noted that the first and second concave portions 43 and 44 are provided on the terminal surface 101 for the purpose of preventing erroneous insertion and may be omitted depending on the specifications. Similarly, the locking portion 51 formed on the rear surface 14 of the battery pack 100 may be omitted depending on the specifications.

The top cover 31 has the configuration including the pair of reference pins 311 for positioning of the wiring substrate 21 and the pair of fixing claws 312 for fixing the wiring substrate 21, but it is not limited thereto. The top cover 31 may not be provided with the reference pins 311 and the fixing claws 312. In such a case, the wiring substrate 21 has a configuration free from the pair of through-holes 201a through which the pair of reference pins 311 pass.

It should be noted that the present technology may have the following configurations.

(1) A battery pack, including:
a pack body having a first main surface and a second main surface that are opposed to each other in a first axis direction, a first end surface and a second end surface that are opposed to each other in a second axis direction orthogonal to the first axis direction, and a first side surface and a second side surface that are opposed to each other in a third axis direction orthogonal to the first axis direction and the second axis direction; and
a plurality of terminals including a positive terminal, a negative terminal, a temperature detection terminal, and a control terminal that are arranged on the first end surface along the third axis direction, the negative terminal being arranged between the temperature detection terminal and the control terminal and closer to the control terminal than the temperature detection terminal.

(2) The battery pack according to (1) above, in which
the first end surface includes
a first terminal window to expose the control terminal to an outside,
a second terminal window that is provided apart from the first terminal window by a first gap and exposes the negative terminal to the outside,
a third terminal window that is provided apart from the second terminal window by a second gap larger than the first gap and exposes the temperature detection terminal to the outside, and
a fourth terminal window to expose the positive terminal to the outside.

(3) The battery pack according to (1) or (2) above, in which
the temperature detection terminal is arranged between the negative terminal and the positive terminal.

(4) The battery pack according to (3), in which
the positive terminal has an area larger than that of the negative terminal.

(5) The battery pack according to any one of (1) to (4) above, in which
the first end surface includes a first concave portion provided close to the first side surface and a second concave portion provided close to the second side surface, and
the first concave portion and the second concave portion are arranged on the first end surface and closer to the second main surface than the first main surface.

(6) The battery pack according to (5) above, in which
the plurality of terminals are arranged on the first end surface and closer to the first side surface than the second side surface.

(7) The battery pack according to (5) above, in which
the first concave portion has a width dimension larger than that of the second concave portion in the third axis direction.

(8) The battery pack according to (7), in which
the first concave portion and the second concave portion each have a height dimension of 1.8 mm or more along the second axis direction.

(9) The battery pack according to any one of (1) to (8) above, in which
the plurality of terminals are arranged on the first end surface and closer to the first main surface than the second main surface.

(10) The battery pack according to (9) above, in which
the second end surface includes a locking portion to be locked to an electronic apparatus, and
the locking portion is arranged on the second end surface and closer to the second main surface than the first main surface.

Further, the present technology may also have the following configurations.

(1) A battery pack, including:
a first main surface;
a second main surface opposed to the first main surface in a first axis direction;
a first end surface provided between the first main surface and the second main surface and including a plurality of terminals including a positive terminal, a negative terminal, a temperature detection terminal, and a control terminal, the plurality of terminals being arranged closer to the first main surface than the second main surface;
a second end surface opposed to the first end surface in a second axis direction orthogonal to the first axis direction, and including a locking portion that is configured to be locked to a battery pack mounting device and arranged closer to the second main surface than the first main surface;
a first side surface provided between the first main surface and the second main surface; and
a second side surface opposed to the first side surface in a third axis direction orthogonal to the first axis direction and the second axis direction.

(2) The battery pack according to (1) above, in which
the first end surface includes a first concave portion provided close to the first side surface and a second concave portion provided close to the second side surface, and
the first concave portion and the second concave portion are arranged on the first end surface and closer to the second main surface than the first main surface.

(3) The battery pack according to (2) above, in which
the plurality of terminals are arranged on the first end surface and closer to the first side surface than the second side surface.

(4) The battery pack according to (3) above, in which
the first concave portion has a first width dimension in the third axis direction, and
the second concave portion has a second width dimension smaller than that of the first width dimension in the third axis direction.

(5) The battery pack according to (4) above, in which
the first concave portion and the second concave portion each have a height dimension of 1.8 mm or more along the second axis direction.

(6) The battery pack according to any one of (1) to (5) above, in which
the plurality of terminals are arranged on the first end surface and closer to the first side surface than the second side surface.

(7) The battery pack according to (6) above, in which
the locking portion is arranged on the second end surface and closer to the first side surface than the second side surface.

(8) The battery pack according to (7) above, in which
the locking portion is arranged closer to the first side surface than a terminal of the plurality of terminals, the terminal being located closer to the first side surface.

Further, the present technology may also have the following configurations.

(1) A battery pack for an imaging apparatus that captures at least one of a still image and a moving image, the battery pack including:
a first main surface;
a second main surface opposed to the first main surface in a first axis direction and having a distance of 9 mm±2 mm from the first main surface;
a first end surface provided between the first main surface and the second main surface;
a second end surface opposed to the first end surface in a second axis direction orthogonal to the first axis direction and having a distance of 43 mm±2 mm from the first end surface;
a first side surface provided between the first main surface and the second main surface; and
a second side surface opposed to the first side surface in a third axis direction orthogonal to the first axis direction and the second axis direction and having a distance of 30 mm±2 mm from the first side surface.

(2) The battery pack according to (1) above, in which
the first end surface includes a plurality of terminals including a positive terminal, a negative terminal, a temperature detection terminal, and a control terminal.

(3) The battery pack according to (2) above, in which
the first end surface includes a first concave portion provided close to the first side surface and a second concave portion provided close to the second side surface, and
the first concave portion and the second concave portion are arranged on the first end surface and closer to the second main surface than the first main surface.

(4) The battery pack according to (3) above, in which
the plurality of terminals are arranged on the first end surface and closer to the first main surface than the second main surface.

(5) The battery pack according to (4) above, in which
the second end surface includes a locking portion configured to be locked to a battery pack mounting device, and
the locking portion is arranged on the second end surface and closer to the second main surface than the first main surface.

Further, the present technology may also have the following configurations.

(1) A battery pack, including:
a pack body having
a first main surface and a second main surface that are opposed to each other in a first axis direction,
a first end surface and a second end surface that are opposed to each other in a second axis direction orthogonal to the first axis direction, and
a first side surface and a second side surface that are opposed to each other in a third axis direction orthogonal to the first axis direction and the second axis direction; and
a plurality of terminals including at least a positive terminal, a negative terminal, and a temperature detection terminal that are arranged on the first end surface along the third axis direction, and a plurality of terminal windows configured to expose the terminals to outside, including a first terminal window related to the positive terminal, a second terminal window related to the negative terminal, a third terminal window related to the temperature detection terminal, and a fourth terminal window that are arranged on the terminals,
wherein the second terminal window being arranged between the third terminal window and the fourth terminal window and closer to the fourth terminal window than the third terminal window.

(2) The battery pack according to (1) above, in which
the temperature detection terminal is arranged between the negative terminal and the positive terminal.

(3) The battery pack according to (1) above, in which
the positive terminal has an area larger than that of the temperature detection terminal.

(4) The battery pack according to (1) above, in which
the first end surface includes a first concave portion provided close to the first side surface and a second concave portion provided close to the second side surface, and
the first concave portion and the second concave portion are arranged on the first end surface and closer to the second main surface than the first main surface.

(5) The battery pack according to any one of (1) to (4) above, in which
the plurality of terminal windows are closer to the first main surface than the second main surface.

(6) The battery pack according to any one of (1) to (5) above, in which
the first concave portion has a width dimension larger than that of the second concave portion in the third axis direction.

(7) The battery pack according to (6), in which the first concave portion and the second concave portion each have a height dimension of 1.8 mm or more along the second axis direction.

(8) The battery pack according to (1), in which the second end surface includes a locking portion configured to be locked to an electronic apparatus, and the locking portion is arranged on the second end surface and closer to the second main surface than the first main surface.

DESCRIPTION OF SYMBOLS

10 pack body
20 terminal unit
21*a* positive terminal
21*b* negative terminal
21*c* temperature detection terminal
21*d* control terminal
42,42*a* to 42*d* terminal window
43 first concave portion
44 second concave portion
51 locking portion
100 battery pack
101 terminal surface
200,210 electronic apparatus

The invention claimed is:
1. A battery pack, comprising:
a pack body having a first main surface and a second main surface that are opposed to each other in a first axis direction, a first end surface and a second end surface that are opposed to each other in a second axis direction orthogonal to the first axis direction, and a first side surface and a second side surface that are opposed to each other in a third axis direction orthogonal to the first axis direction and the second axis direction;

a plurality of terminals including at least a positive terminal, a negative terminal, and a temperature terminal that are arranged on the first end surface along the third axis direction; and a cover having a plurality of terminal windows placed on the first end surface, configured to expose the terminals to outside, wherein the first end surface includes a first side region and a second side region opposed to each other in a width direction, each of the first side region and the second side region being formed by a part of a peripheral surface of having a cylindrical shape with a predetermined radius, wherein for each of the first side region and the second side region, a circumference of a circle formed by the cylindrical shape overlaps with one of the plurality of terminals, wherein the first end surface includes a first concave portion provided close to the first side surface and a second concave portion provided close to the second side surface, and wherein the first concave portion has a width dimension larger than that of the second concave portion in the third axis direction.

2. The battery pack according to claim 1, wherein the plurality of terminal windows includes at least a first terminal window related to the positive terminal, a second terminal window related to the negative terminal, and a third terminal window related to the temperature terminal.

3. The battery pack according to claim 2, wherein the plurality of terminal windows are closer to the first main surface than the second main surface along the first axis.

4. The battery pack according to claim 2, wherein the circumference of the circle formed by the first side region overlaps with the first terminal window.

5. The battery pack according to claim 1, wherein the first concave portion is provided within the circumference of the circle formed by the first side region, and wherein the second concave portion is provided within the circumference of the circle formed by the second side region.

6. The battery pack according to claim 1 wherein the first concave portion and the second concave portion are arranged closer to the second main surface than the first main surface.

7. The battery pack according to claim 1 wherein the first concave portion and the second concave portion each have a height dimension of 1.8 mm or more along the second axis direction.

8. The battery pack according to claim 1, wherein the plurality of terminal windows comprises four terminal windows arranged on the first end surface along the third axis direction.

9. The battery pack according to claim 8, wherein the fourth terminal window is related to a control terminal.

10. The battery pack according to claim 9, wherein the circumference of the circle formed by the second side region overlaps with the fourth terminal window.

11. The battery pack according to claim 1, wherein the temperature terminal is located between the positive terminal and the negative terminal along the third axis direction.

12. A battery pack, comprising:

a pack body having a first main surface and a second main surface that are opposed to each other in a first axis direction, a first end surface and a second end surface that are opposed to each other in a second axis direction orthogonal to the first axis direction, and a first side surface and a second side surface that are opposed to each other in a third axis direction orthogonal to the first axis direction and the second axis direction;

a plurality of terminals including at least a positive terminal, a negative terminal, and a temperature terminal that are arranged on the first end surface along the third axis direction; and a cover having a plurality of terminal windows placed on the first end surface, configured to expose the terminals to outside, wherein the plurality of terminals are arranged on the first end surface closer to the first side surface than the second side surface, and wherein a center line of the first end surface that extends in the first axis direction, extends across the negative terminal.

13. The battery pack according to claim 12, wherein the plurality of terminal windows includes at least a first terminal window related to the positive terminal, a second terminal window related to the negative terminal, and a third terminal window related to the temperature terminal.

14. The battery pack according to claim 13, wherein, with respect to a center line of the first end surface that extends in the first axis direction, the positive terminal, the temperature terminal, and a portion of the negative terminal are located on a side of the center line closer to the first side surface.

15. The battery pack according to claim 12, wherein the positive terminal has an area larger than that of the temperature terminal.

16. The battery pack according to claim 12, wherein the negative terminal has an area larger than that of the temperature terminal.

17. The battery pack according to claim 12, wherein the one corner portion of the one terminal window positioned closest to the first side surface along the third axis has a larger radius of curvature than corner portions of each of the remaining plurality of terminal windows.

* * * * *